United States Patent Office 3,477,980
Patented Nov. 11, 1969

3,477,980
EMULSION POLYMERIZATION OF VINYL ACETATE WITH VINYL ALKYL ETHERS
Wiley E. Daniels, Easton, Pa., assignor to GAF Corporation, a corporation of Delaware
No Drawing. Filed Oct. 22, 1965, Ser. No. 502,291
Int. Cl. C08f *1/13, 15/16*
U.S. Cl. 260—29.6                                    17 Claims

ABSTRACT OF THE DISCLOSURE

The emulsion copolymerization of vinyl acetate with a vinyl alkyl ether, such as isobutyl vinyl ether, by adding separate aqueous solutions of the monomeric components and the catalyst to an aqueous emulsion medium simultaneously, at a rate approximating that of the polymerization reaction.

---

This invention relates in general to emulsion polymerization and in particular to a novel and improved process for the copolymerization of vinyl acetate with an alkyl vinyl ether in aqueous emulsion media as well as to the novel products produced thereby.

Many of the commercial applications for vinyl acetate/vinyl alkyl ether copolymers require their availability in the form of aqueous emulsions such as employed in the paint, coatings, adhesives, polishers and textile sizing fields. As is well known, aqueous polymer emulsions possess a great many advantages as compared, for example, to organic solvent systems. As examples of the more significant advantages there may be mentioned the substantial absence of fire hazards, odor, and the like, low toxicity, low cost, etc. From a commercial standpoint, it is particularly desirable that such aqueous polymer emulsions be prepared directly according to aqueous emulsion polymerization techniques in view of such factors as economy, the safety characterizing the use of water as the polymerization medium, the ease of temperature control, and more importantly, the fact that the desired product is obtainable directly in emulsion form.

However, the methods heretofore provided for copolymerization of alkyl vinyl ethers with vinyl acetate under aqueous emulsion conditions have met with only limited success and fall considerably short of satisfying the requirements of commerce. In fact, according to the literature, serious problems arise in connection with vinyl acetate/alkyl vinyl ether copolymerizations regardless of the particular polymerization method employed, i.e. bulk solution, emulsion, etc. Emulsion polymerization techniques, however, have been a particular source of difficulty and especially in connection with attempts to achieve commercially acceptable polymerization reaction rates, polymer yields and the like. Moreover, the known emulsion polymerization techniques are uniformly characterized by such signal disadvantages as the markedly low solids content of the polymer latex product, the relatively minor proportion of vinyl alkyl ether incorporated into the resultant polymer, and the intolerably high ratio of monomer which remains unreacted upon substantial cessation of the polymer-forming reaction.

Various procedures have been resorted to in an effort to overcome or otherwise mitigate the foregoing disadvantages. However, the improvements offered by such techniques have been marginal only, and leave considerable room for improvement with respect to such properties as emulsion stability, purity, odor, clarity, polymerization reaction rate and the like. As a consequence, commercialization of such techniques to any significant extent has been correspondingly retarded.

It is thus a primary object of the present invention to provide an emulsion polymerization process for the copolymerization of vinyl acetate and an alkyl vinyl ether which eliminates substantially the disadvantages characterizing the methods heretofore provided.

It is a further object of the present invention to provide an emulsion polymerization process for the copolymerization of vinyl acetate and an alkyl vinyl ether which is characterized by an appreciable reduction in reaction time, residual monomer content and the like.

It is a still further object of the present invention to provide copolymerization products of vinyl acetate and vinyl alkyl ethers in the form of aqueous emulsions thereof, wherein said emulsions are characterized by improved stability, solids content, vinyl ether content, and the like.

Other objects and advantages will appear hereinafter as the description proceeds.

The attainment of the foregoing and related objects is made possible by the present invention, which, in its broader aspects, provides a process for the emulsion polymerization of vinyl acetate with an alkyl vinyl ether which comprises the incremental or gradual addition to an aqueous emulsion polymerization medium devoid of polymerization catalyst of separate solutions of (a) a mixture of the polymerizable monomers and (b) a free radical supplying polymerization catalyst, wherein said solutions are added at a rate approximating the polymerization reaction rate prevailing in the aqueous emulsion medium, said monomer addition being further so controlled that the total amount of unreacted monomer present in the emulsion medium during the course of the polymerization reaction does not exceed approximately 7% by weight based on the combined amounts of the total monomer to be polymerized and the total amount of water present in the aqueous emulsion medium and said catalyst addition is further so controlled as to be substantially coextensive in time with said monomer addition.

When proceeding according to the above-stated method, it is found that stable emulsion lattices of up to 65–70% solids and higher can be economically obtained. Moreover, it is not unusual for such polymer products to contain up to 20% by weight and higher of vinyl alkyl ether in the polymer molecule thus representing a considerable improvement over the prior art. In addition, it is found that the amount of residual monomer remaining unreacted in the emulsion medium upon substantial completion of the polymerization reaction is reduced to a negligible minimum on the order of 1% and less, thereby leading to substantial savings.

The results provided by the present invention critically depend on the introduction of both the catalyst and monomer charges into the aqueous emulsion polymerization medium in gradual or incremental fashion. In this connection, it is found that if only the monomer charge, for example, be added incrementally to a preformed polymerization medium containing the total catalyst charge, the results do not differ substantially from those obtained according to techniques wherein the total quantities of catalyst and monomer are charged initially. Typically, the latter mentioned procedures are characterized by a relatively large and rapid increase in emulsion viscosity to the extent that stirring is made practically impossible. This is a particularly significant drawback since any control over latex viscosity is virtually non-existent. As a result, unduly extended polymerization reaction times are required, with the attendant occurrence of side reactions leading to the formation of undesired by-products. As a consequence, the latex must be subjected to one or more suitable aftertreatments for purposes of purification, viscosity, and/or pH adjustment, monomer recovery and the like. Moreover, the product yields and latex solids content are in most cases intolerably low, despite the observance of protracted polymerization time intervals.

In carrying out the process of the present invention and in order to realize the improvements provided thereby, it is essential that the total amount of unreacted monomers present in the emulsion medium at any time during the course of the polymerization be maintained within certain prescribed limits. In emulsion polymerization, it is the customary practice to employ such relative amounts of monomer and water as to yield monomer/water ratios ranging from about 0.1:1 to about 2.5:1 with a range of about 1:1 to about 2.3:1 being preferred.

In accordance with the present invention, it is found that optimum results are obtained with respect to the properties enumerated hereinbefore when the ratio of (a) unreacted monomer present in the emulsion medium at any time during the course of the polymerization to (b) the combined quantities of water and total monomer to be polymerized does not exceed a value of approximately .07.

This can be readily achieved by suitably regulating the rate at which the monomer solution is introduced into the aqueous emulsion medium. In any case, the step-wise or incremental monomer addition should be carried out so that the introduction of any succeeding monomer increment is delayed until polymerization of the preceding increment is substantially complete. Cessation of the exothermic polymer-forming reaction will usually be indicated by the absence of any further heat evolution. In the case where polymerization is effected at elevated temperatures approximating the reflux temperature of the aqueous emulsion medium, the polymerization terminal point will accordingly be indicated by a substantial cessation of reflux.

As previously mentioned, it is likewise critcal to the results of the present invention that the addition of the free-radical supplying polymerization catalyst to the emulsion medium be made concurrently and coterminous with the monomer addition. The amount of catalyst employed should in any case be sufficient to yield the desired polymerization rate. In accordance with the present invention it is found that catalyst quantities in the range from about .04 to about 0.8% and preferably from about 0.1 to about 0.6% by weight of the monomers to be polymerized yield efficacious polymerization rates as well as latex products possessing the desired properties. Accordingly, the amount of catalyst added concurrently with a given increment of monomer charge should be such as to yield a catalyst/monomer-increment ratio coming within the aforedescribed range. As an illustration, if the total monomer charge to be polymerized is added in 10 equal increments, the total catalyst to be employed would likewise preferably be added in 10 equal increments. However, other embodiments of the present invention contemplate procedures wherein up to 30% by weight and higher of the total catalyst to be employed is added with the first monomer increment. The incremental additions of both the catalyst and monomer solutions would, of course, be carried out synchronously.

The rate parameters governing the monomer and catalyst additions in accordance with the present invention can also be expressed mathematically by the following equations:

$$\frac{M_u}{W+M_t} \leq 0.07$$

wherein $M_u$ represents the total amount of unreacted monomers present in the aqueous emulsion medium at a given time during the polymerization reaction; $M_t$ represents the total amount of monomer to be polymerized and W represents the total amount of water present in the emulsion medium.

Correlatively, the amount of catalyst usually introduced synchronously with a given increment of monomer can be represented as follows:

$$\frac{C}{N}=C_p$$

wherein C represents the total quantity of catalyst to be employed; N represents the total number of increments to be utilized in adding the monomer and catalyst solutions; and $C_p$ represents the amount of catalyst contained in a given increment. Accordingly, (N) ($C_p$)=total catalyst to be charged Moreover, $M_u$ will closely approximate the amount of monomer contained in a given increment which can be represented as $M_p$. Accordingly, (N) ($M_u$)≈(N) ($_p$)≈total monomer to be polymerized As stated above, the monomer materials contemplated for use in the process of the present invention are (a) vinyl acetate and (b) an alkyl vinyl ether. The alkyl vinyl ethers may be represented by the following formula:

$$CH_2=CH-OR$$

wherein R represents an alkyl group of from about 1 to about 18 carbon atoms, which may be branched or straight chain and include for example, methyl, ethyl, undecyl, dodecyl, etc. The relative proportions of monomer employed may vary within wide limits. Preferably, however, the monomer mixture varies in composition from 0.1 to 35 weight percent vinyl ether and, correspondingly, 99.9 to 65 weight percent vinyl acetate. Although such percentages are preferred, it is to be understood that such relative proportions may be varied within limits without in any way deleteriously affecting the results of the present invention. However, it is found that when the amount of vinyl ether employed substantially exceeds 35% by weight, certain of the advantageous features provided by the present invention such, as improved reaction rate and the like, tend to be affected adversely. The total amount of monomer employed is dictated in large part by the corresponding solids content desired in the latex product and, consequently, the amount of water present. Accordingly, the monomer mixture may range up to 70% by weight and higher, based on the weight of the latex product, or, alternatively, on the weight of the polymerization medium. In any event, it is preferred to use monomer quantities such as to yield a monomer/water ratio coming within the range previously stated, namely, 1:1 to 2.3:1. The minimum amount of monomer employed is largely a matter of choice depending primarily on the requirements of the processor and correlatively, the ultimate commercial use contemplated for the latex product. In many commercial applications latex products having minimum solids concentration on the order of 50-55% by weight are preferred.

The polymerization catalysts found to be especially suitable for use in the process of the present invention and which yield aqueous polymer emulsions possessing to a substantial extent the desired properties referred to above are well known in the art and may, in general, be any free-radical-supplying catalyst conventionally employed in the polymerization of vinyl-type compounds, i.e., compounds containing carbon to carbon ethylenic unsaturation. Typical of the catalyst materials included within the foregoing definition are those which yield oxygen under the conditions of the polymerization. As examples thereof there may be mentioned without limitation—inorganic peroxides, e.g., hydrogen peroxide, barium peroxide, magnesium peroxide, etc.; organic peroxides, e.g., diethyl peroxide, dipropyl peroxide, dilauryl peroxide, dioleyl peroxide, distearyl peroxide, di-(t-butyl) peroxide, di-(t-amyl) peroxide, etc.; the alkyl hydrogen peroxides, e.g., t-butyl hydrogen peroxide, t-amyl hydrogen peroxide, etc.; symmetrical diacyl peroxides such as those commonly referred to as acetyl peroxide, propionyl peroxide, lauroyl peroxide, stearoyl peroxide, malonyl peroxide and succinyl peroxide, benzoyl peroxide, phthaloyl, etc.; fatty oil acid peroxides, e.g., the coconut acid peroxides, and the like; unsymmetrical or mixed acyl peroxides, e.g., acetyl, benzoyl peroxide; propionyl, benzoyl peroxide; salts of inorganic per-acids, e.g., ammonium persulfate, the alkali metal persulfates such as sodium persulfate, potassium persulfate; the alkali metal percarbonates, such as sodium percarbonate, potassium percarbonate, and the like; the alkali metal perborates such as sodium perborate, potassium perborate, and the like; the alkali metal perphosphates such as sodium perphosphate, potassium perphosphate, and the like. Other compounds which liberate free radicals under the conditions of the polymerization may also be used to advantage and include, for example, the azo-type catalysts, i.e., compounds containing the azo linkage. As examples thereof there may be mentioned in particular $\alpha,\alpha'$-azobis ($\alpha,\gamma$-dimethyl valeronitrile), $\alpha,\alpha'$-azobis ($\alpha$-methyl butyronitrile) $\alpha,\alpha'$-azobis-diisobutyramide, dimethyl and diethyl $\alpha,\alpha'$-azobis-diisobutyrate, and the like.

According to the preferred embodiments of the present invention, the catalyst selected is of the water-soluble variety. As examples of the latter materials there may be mentioned in particular and without limitation, sodium, potassium and ammonium persulfates, hydrogen peroxide and the like.

The aqueous emulsion polymerization medium which serves as the environment for the polymer-forming reaction is comprised of various ingredients commonly employed in emulsion-type polymerization methods. Such ingredients are well known in the art and include, for example, surface-active agents, protective colloids, plasticizers, thickeners, buffering agents and the like. It is to be further understood that such additives as plasticizers and thickeners can be added to the aqueous emulsion medium before, during or after the polymerization reaction is completed. The surface-active agents found to be eminently suitable for use herein are, in general, those of the cationic and/or nonionic types.

As examples of the anionic type surface-active agents there may be mentioned in particular and without limitation the alkali metal alkali sulfates, wherein the alkyl group contains preferably from 8 to 18 carbon atoms, such as sodium lauryl sulfate, sodium stearyl sulfate, etc.; the alkali metal long chain alkaryl sulfonates, such as sodium dodecyl benzene sulfonate, sodium lauryl benzenesufonate, sodium stearyl benzene sulfonate, etc., as well as the alkaryl polyether sulfates, and the like.

As examples of the nonionic surface-active agents, there may be mentioned in particular and without limitation the alkaryloxypoly (alkyleneoxy) alkenols such as nonylphenoxypoly (ethyleneoxy) ethanol. Materials of this type and found to be especially suitable are available from the General Aniline and Film Corporation under the tradename Igepal. In general, these products can be represented by the following general formula:

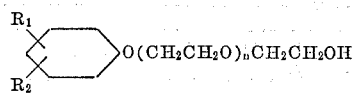

wherein $R_1$ and $R_2$ represent alkyl of preferably 8 to 18 carbon atoms, e.g., octyl, nonyl, decyl, lauryl, stearyl, etc., and $n$ has a value of from 0 to 200 and higher. It should further be understood that products of the above type wherein the alkyleneoxy groups are different, as would be the case where mixtures of different alkylene oxides are employed in forming the polyether product, are likewise fully operative in the process provided herein. Blends of anionic and nonionic surfactants may also be used to good advantage.

As examples of the cationic surface-active agents, there may be mentioned in particular and without any limitation such quaternary ammonium compounds as dodecyl trimethyl ammonium chloride, stearyl trimethyl ammonium chloride, and the like.

The proportions of surface-active agent employed should in general be sufficient to yield a stable emulsion polymerization medium which will not undergo phase integration, i.e., coalescence, under the conditions of polymerization. Preferably the amount of surfactant ranges from 0.1 to 4.0% by weight of the aqueous emulsion polymerization medium.

Protective colloids and/or thickening agents may also be employed to advantage in the process of the present invention. As examples thereof there may be mentioned in particular and without limitation such materials as hydroxyethyl cellulose (Cellosize), methyl cellulose, polyvinyl alcohol, carboxymethyl cellulose, copolymers of maleic anhydride with vinyl ethers and/or vinyl esters, polyvinyl pyrrolidone, natural gums, colloidal substances as well as numerous other water-soluble polymeric materials. In certain instances, the nature of the protective colloid selected may well obviate any necessity for the use of an emulsifying agent, i.e., surfactant material. For example, the use of maleic anhydride/vinyl alkyl ether copolymers as the protective colloid is found to allow the desired polymerization reaction to occur in the absence of any emulsifying agent. The maleic anhydride/vinyl ether copolymers found to be particularly suitable in this regard are those available under the tradename designation Gantrez, a product of the General Aniline and Film Corporation. The proportion of protective colloid employed may vary over a wide range. Preferably, however, such materials are employed in amounts ranging from 0.1 to 4.0% by weight based on the aqueous emulsion polymerization recipe.

According to a preferred method for carrying out the process of the present invention, the polymerization medium is further provided with a buffering compound, preferably in amounts ranging from 0.2 to 0.6% by weight of the aqueous emulsion polymerization medium. In general, the buffering agent may be any compound which exhibits a basic reaction under the conditions of the polymerization. As is well known, certain free-radical-supplying polymerization initiators such as typified by potassium persulfate yield acidic by-products, e.g., potassium hydrogen sulfate, during the course of the polymerization. It is important that such by-products be neutralized in order to retard undesired acid hydrolysis of the alkyl vinyl ether compound. Accordingly, it is desirable to include a suitable buffering agent in amounts sufficient to achieve the requisite degree of acid neutralization. Suitable buffering agents include, for example, disodium hydrogen phosphate, the alkali metal salts of weak acids, such as sodium bicarbonate, potassium bicarbonate, and the like. In this connection, however, it should be noted that the pH of the emulsion medium may be influenced by other factors such as the type of protective colloid and/or emulsifying agent employed to the extent that the buffering agent may be eliminated. Such a result has been found to occur, for example, with the use of maleic anhydride/vinyl alkyl ether copolymers as the protective colloid. This is primarily due to the fact that the latter materials themselves have a buffering effect on the reaction medium, which may be sufficient in a particular circumstance to impart the desired pH value.

In forming the aqueous emulsion polymerization medium, the amount of water employed as previously pointed out is such as to yield a weight ratio of water to monomer, the latter including both the vinyl acetate and vinyl alkyl ether, in the range of from about 0.4:1 to about 9:1. However, in order to achieve the production of polymer lattices having high solids content, it is preferred to employ a water/monomer ratio ranging from about 0.4:1 to about 1:1.

In accordance with the present invention, the aqueous emulsion polymerization medium is formed initially by mixing together in the amounts specified the water, one or more protective colloids, surface-active agent and buffering agent with stirring, although in some instances the two latter-mentioned ingredients may be omitted. The manner in which the initial emulsion medium is formed is not particularly critical and, accordingly, any sequence of ingredient addition may be employed. In most cases, it is desirable to preheat the emulsion medium containing the aforedescribed materials in order to expedite solution of the solids. For such purposes it has been determined that temperatures ranging from 65° C. to 95° C. are entirely suitable. When all ingredients have been dissolved to the necessary extent, the monomer and catalyst, the latter being present when of the water-soluble type in the form of an aqueous solution, are introduced at a predetermined rate, such addition being effected in synchronous manner.

The polymerization, in accordance with the present invention, is preferably carried out at elevated temperatures in a reactor provided with a reflux column. Polymerization temperatures in the range of from about 65° C. to about 95° C. have been found to be especially effective. However, it should be understood that the polymerization reaction may be effectively carried out utilizing temperatures ranging down to 20° C. and below. Polymerization under reduced temperatures can further be promoted by other auxiliary ingredients such as promoters, reducing agents and the like. Since the polymerization reaction is exothermic, the initiation thereof will, in most instances, be evidenced by the evolution of heat. When the polymerization has proceeded to the extent that the consumption of monomer is substantially complete, thus indicating the terminal point in the polymer-forming reaction, heat evolution will accordingly diminish. This point in the reaction will usually be accompanied by a drop in the temperature of the reaction medium and/or a cessation in the reflux. Succeeding increments of monomer and catalyst can thereupon the introduced. Generally, it is advisable to regulate the addition of each of the monomer and catalyst solutions so as to maintain the temperature of the reaction mixture within a predetermined maximum. In any event, it is of critical importance to the present invention that the limiting concentration of unreacted monomer present in the emulsion medium at any time during the course of the polymerization be confined within the limits hereinbefore specified. As a general rule, it is found that monomer and catalyst addition rates suitable to the purposes of the present invention range from about 0.1 to about 1.2% by weight per minute of the total amount of the respective catalyst and monomer solutions to be added.

Following complete introduction of the total amount of catalyst and monomer to be polymerized and after polymerization is substantially complete, post-heating and/or stirring of the emulsion medium is preferably continued for a time sufficient to effect maximum polymerization efficiency. Such time periods can range from about 30 minutes to as long as 6 hours or more. Post-heating times substantially in excess of 6 hours are usually not warranted, since the beneficial effects accruing therefrom are usually outweighed by such economic disadvantages as increased operating costs and extended production times per unit of product produced.

The vinyl acetate/vinyl alkyl ether copolymer lattices obtained in accordance with the present invention find wide utility in a variety of applications. For example, such products are eminently suitable in such uses as adhesives, binders, films, protective coatings and paint formulations and the like. More particularly, it has been determined that adhesive compositions based substantially on the copolymer lattices of the present invention may be used to pronounced advantage in forming laminated, molded and/or surface-bonded products formed of a wide variety of materials including metal, porcelain, mica, stone, paper, natural and synthetic fibers, leather, cork, wood, and the like.

The process of the present invention, which is conventionally referred to as a "delayed addition" type of emulsion polymerization, is not to be confused with polymerization methods known as "suspension" or "emulsion delayed addition."

In polymerizations of the suspension type, the total amount of monomers to be polymerized is charged initially to the polymerization medium. Moreover, the polymer products obtained are usually in the form of large particles or polymer beads which either settle out or can be separated from the aqueous reaction medium by conventional filtration methods.

The method of the present invention, however, differs from the aforedescribed techniques in at least two essential particulars. Firstly, in the instant process, both the monomers and catalyst are introduced in gradual or incremental fashion. Secondly, the products of the present invention, in contradistinction to those resulting from suspension techniques, are obtained in the form of finely divided emulsions or lattices. Physically based separative techniques such as filtration would, of course, be totally ineffective. In the "emulsion-delayed addition" type of polymerization process, the monomer material to be introduced into the emulsion medium is likewise present in emulsion form, i.e., the monomer-containing medium also comprises such other ingredients as water, surfactant, protective colloid, buffering agent, and the like. According to the present invention, however, the monomer to be added is provided in non-emulsified form and is typically a mere physical admixture of the comonomers, namely, vinyl acetate and vinyl alkyl ether.

The method and emulsions of the present invention having been broadly described, the following examples are given to illustrate specific embodiments thereof. However, it will be understood that such examples are given for purposes of illustration only and are in no way to be considered as being limitative. In order to clearly demonstrate and compare the method and products of the present invention with the prior art methods heretofore provided, the following control procedure is given:

EXAMPLE I

This example illustrates the process of emulsion polymerization in which all ingredients are charged initially. Here, and in the examples which follow, HEC stands for hydroxyethylcellulose, WP09 and WP300 representing different viscosity grades. The latter materials are commercially available from the Union Carbide Corporation. Igepal CO–630 is a nonylphenolethylene oxide adduct containing about 10 ethylene oxide units and is a product of the General Aniline & Film Corporation.

The following polymerization recipe is employed:

| | G. |
|---|---|
| $H_2O$ | 651 |
| Cellosize HEC WP09 | 21.9 |
| Cellosize HEC WP300 | 8.4 |
| Igepal CO–630 | 2.4 |
| $Na_2HPO_4 \cdot 12H_2O$ | 3.0 |
| $K_2S_2O_8$ | 3.0 |
| Isobutyl vinyl ether (IBVE) | 131.5 |
| Vinyl acetate (VA) | 540 |

The protective colloids, surface-active agent, buffer and water are added to a 3 liter round bottomed flask equipped with a stirrer, thermometer, addition funnel containing the total monomer charge and provided with a vacuum distilling head connected to a condenser. The flask is heated in a water bath to approximately 75° C. whereupon solution of all solids occurs. The flask is then cooled to 35° C., the potassium persulfate added, following which the flask is evacuated by suitable suction and filled with a nitrogen to a pressure of about 1 atmosphere. The monomer mixture is introduced with stirring into the aqueous emulsion medium by means of the addition funnel and the flask is then closed to the atmosphere (via an oil seal) and heated to 65° C. at which temperature polymerization is initiated. After a period of 6 hours the flask contents had become exceedingly viscous to the extent that stirring was not possible. The heating of the flask is continued overnight, maintaining a temperature of approximately 80° C. without stirring. After a total of 22 hours reaction time, unreacted monomers are distilled out of the system and there is obtained 103 ml. of distillate (13.5% by weight of the total monomer charge) which on analysis was found to contain, by weight, 15.4% IBVE, 49.74% VA, 8.78% acetaldehyde and 25.86% isobutyl alcohol.

The latex which remained in the flask as a distillation residue was further characterized as follows:

| | |
|---|---|
| Weight _____g__ | 1218 |
| pH _____g__ | 4.2 |
| Brookfield viscosity _____cps__ | 1780 |
| MFT (minimum film-forming temperature) _° C__ | 11 |
| Copolymer composition (percent VA by IR) ____ | 85 |
| Copolymer $N_{sp}$ (1.0 wt./mol. percent in CHCl$_3$) _____ | 0.712 |

EXAMPLES 2–14

The process of the present invention is illustrated by the following examples in which the following procedure is observed. The corresponding polymerization recipes are summarized in Table I. The protective colloid, surface-active agent, buffer and water in the proportions specified in Table I are charged to a 3-liter round-bottom flask equipped with a stirrer, reflux condenser, thermometer and two graduated addition funnels, each containing the respective monomer and catalyst charges. The catalyst, unless otherwise indicated in the table, is provided as a solution in 100 ml. water. The flask is heated to a temperature within the range of 65–95° C. by means of the external water bath until all solids are dissolved. Thereupon, 10% of each of the catalyst and monomer solutions is introduced with stirring. The polymerization reaction is carried out utilizing temperatures within the range of 65–95° C. with a range of 70–85° C. being preferred. The exothermic polymer-forming reaction is accompanied by a rise in the temperature of the emulsion medium. Substantial consumption of monomer is indicated by a levelling off or drop in the reaction temperature and/or the cessation of reflux. At this time, there is introduced into the polymerization medium another 10% increment of each of the monomer and catalyst solutions. The foregoing sequence is repeated until all monomer and catalyst have been added. Following the addition of the final increment of monomer and catalyst, heating of the reaction medium is continued for a time interval as indicated in Table II. Usually, the post-heating period will be accompanied by a temperature rise in the reaction medium to approximately 86–96° C. Again, the terminal point in the polymerization reaction is indicated by a temperature drop and/or cessation of reflux. In some cases, slight reflux was noted at temperatures approximating 89–90° C., which was probably due to an isobutyl alcohol/water azeotrope. The latex products thus obtained were in all cases quite fluid, being of low to medium viscosity. The products are allowed to cool down to approximately room temperature and then filtered through a No. 200 mesh copper sieve in order to remove the coarser particles. The properties of the latex products thus obtained were evaluated and are tabulated in Table III.

As an inspection of the foregoing data reveals, the process of the present invention is characterized by exceptionally low residual monomer contents upon completion of the polymerization reaction as compared to the control procedure wherein the catalyst and monomer are initially charged, in toto, to the aqueous emulsion medium.

With reference to Example 7 as an illustration, it will be noted that the complete addition of monomer and catalyst was accomplished in a period of 3½ hours followed by a post-heating period of 1½ hours for a total pot time of 5 hours. As indicated in Table III, there was obtained a latex product having a solids content somewhat in excess of 60.0% which is unusually high for this type of polymerization. Moreover, analysis of the polymer product indicated a vinyl ether content of approximately 20%. In Control Example I, however, the polymerization was carried out for a period of 22 hours, which represents a 340% increase in reaction time alone, and yet the polymer product was obtained in only a 87% yield. From an economic standpoint alone, the advantages provided by the present invention are clearly manifest. Of primary significance also, is the fact that the amount of residual monomer remaining unreacted upon substantial completion of the polymerization reactions when carried out in accordance with the present invention are on the order of 1% and lower in no instance exceeded 3.3%. The results in this regard are particularly outstanding since maximum utilization of monomers is achieved with a concomitant increase in polymer yield. In this connection, it will be noted from an examination of Table III that the present invention typically provides polymer yields on the order of 90% and higher. This is a particularly surprising result since the procedures heretofore provided for the emulsion copolymerization of vinyl acetate and alkyl vinyl ethers are uniformly characterized by intolerably low monomer conversion levels and correspondingly, inferior polymer yields. For example, according to Schildknecht in "Vinyl and Related Polymers," John Wiley & Sons, 1952, p. 626, it is stated that copolymerization of vinyl ethers with vinyl acetate "in bulk, solution or emulsion employing peroxide catalysts can be employed but difficulties are encountered in slowness of the reaction rate." It has also been previously reported in published literature that vinyl ethers could be copolymerized with vinyl acetate by persulfate-initiated emulsion polymerization only with considerable difficulty. Moreover, Schildknecht in "Monomers," Ed. Blout & Mark Interscience 1951, p. 46, describes an emulsion copolymerization of isobutylvinylether and vinyl acetate which gave, however, only a 65% yield of polymer after a polymerization time of 18 hours employing reaction temperature within the ranges 55–60° C. The catalyst employed was of the redox type. Although the foregoing examples illustrate the process of this invention wherein the catalyst and monomer solutions are added to the emulsion medium in amounts approximating 10% of each of the total catalyst and total monomer to be polymerized, it should be understood that the present invention is in no way limited thereto. Results similar and, in some cases, superior to those tabulated herein are obtained in accordance with the present invention when the monomer and catalyst solutions are synchronously introduced to the polymerization medium utilizing significantly larger numbers of increments. Moreover, improved results are likewise obtained when the monomer and catalyst are added in increments containing by weight up to 16% and higher of the total monomer and catalyst, respectively, to be employed. In this connection, it will be noted that the present invention also contemplates the addition of the monomer and catalyst to the polymerization medium at a rate which approximates the polymerization reaction rate. This can be readily accomplished, for example, by the drop-wise addition of monomers and catalysts continuously to the emulsion medium, said additions being effected over a predetermined time interval. In any event, the rate of monomer and catalyst feed should be such as to yield unreacted monomer concentrations in the emulsion medium consonant with the limitations specified hereinabove. It should likewise be understood that succeeding increments of monomer and catalyst need not be uniform in amount. In some cases, it may be desirable to vary the amount of monomer and/or catalyst contained in a given incremental addition in order to achieve a predetermined result. In this connection, attention is directed to Example 7 wherein approximately 30% of the total catalyst used was added with the initial 10% monomer increment.

This invention has been disclosed with respect to certain preferred embodiments, and there will become obvious to persons skilled in the art various modifications and variations thereof which are intended to be included within the spirit and scope of this invention.

What is claimed is:
1. An emulsion polymerization process for the preparation of a stable, aqueous emulsion of a copolymer of vinyl acetate and a vinyl alkyl ether which comprises incrementally adding to an aqueous emulsion medium devoid of polymerization catalyst, separate solutions comprising respectively (a) a monomer mixture consisting essentially of from 65 to 99.9% by weight vinyl acetate and correspondingly from 0.1 to 35% by weight vinyl alkyl ether and (b) a free-radical-supplying polymerization catalyst, wherein said monomer and catalyst solutions are added at a rate approximating the polymerization reaction rate extant in the said emulsion medium, said additions being further so controlled that the

TABLE I

| Formulation | Examples—All Weights Given in Grams | | | | | | | | | | | | |
|---|---|---|---|---|---|---|---|---|---|---|---|---|---|
| | 2 | 3 | 4 | 5 | 6 | 7 | 8 | 9 | 10 | 11 | 12 | 13 | 14 |
| Protective Colloid: | | | | | | | | | | | | | |
| Cellosize HEC WP09 [1] | 21.9 | 21.9 | 21.9 | 21.9 | 21.9 | 21.9 | | | 21.9 | 21.9 | 21.9 | 21.9 | 21.9 |
| Cellosize HEC WP300 [2] | 8.4 | | | | | | 10.4 | 21.9 | | | | | |
| Surface Active Agent: | | | | | | | | | | | | | |
| Igepal CO-630 [3] | 2.4 | 2.4 | 2.4 | 2.4 | 2.4 | 2.4 | 2.4 | 2.4 | 2.4 | 2.4 | | | 2.4 |
| Sodium lauryl sulfate | | | | | | | | | | | 2.4 | | ([5]) |
| Dodecyltrimethyl ammonium chloride | | | | | | | | | | | | 13.7 | |
| Polymerization Initiator: | | | | | | | | | | | | | |
| $K_2S_2O_8$ [4] | 3.0 | 3.0 | 3.0 | 3.0 | 3.0 | [4] 3.0 | 3.0 | 3.0 | 3.0 | 3.0 | 3.0 | 3.0 | ([6]) |
| $H_2O_2$ | | | | | | | | | | | | | 3.0 |
| Water | 651 | 551 | 551 | 551 | 485 | 494.4 | 551 | 551 | 444.4 | 444.4 | 551 | 444.4 | 444.4 |
| $Na_2HPO_4 \cdot 12H_2O$ | 3.0 | 3.0 | 3.0 | 3.0 | 3.0 | 3.0 | 3.0 | 3.0 | 3.0 | 3.0 | 3.0 | 3.0 | 3.0 |
| Monomers: | | | | | | | | | | | | | |
| Vinyl Acetate | 540 | 540 | 540 | 540 | 633.9 | 668.6 | 610 | 474.9 | 707.8 | 589.9 | 540 | 707.8 | 707.8 |
| Vinyl Alkyl ether: | | | | | | | | | | | | | |
| n-Butyl vinyl ether | | 129.5 | | | 111.9 | 117.9 | 63.6 | 203.6 | | | 129.5 | 177 | 177 |
| i-Butyl vinyl ether | 131.5 | | | | | | | | 78.7 | 196.6 | | | |
| n-Octyl vinyl ether | | | 129.5 | | | | | | | | | | |
| Dodecyl vinyl ether | | | | 147 | | | | | | | | | |
| Weight percent in monomer mixture | 19.6 | 19.4 | 91.4 | 19.4 | 15 | 15 | 9.4 | 30 | 10 | 25 | 19.4 | 20 | 20 |

[1][2] Hydroxyethel cellulose—Union Carbide.
[3] Nonylphenoxypoly (ethylenoxy)₆ethanol—General Aniline and Film Corp.
[4] Solution in 50 ml. $H_2O$.
[5] 50% active in isopropyl alcohol.
[6] As 30% solution in $H_2O$.

TABLE II

| | Time for Total Monomer and Catalyst Addition (Hrs.) | Post Heating Period Following Addition of Final Monomer and Catalyst Increments (Hrs.) | Monomer Addition Rate (gms./min.) | Catalyst Addition Rate (milligrams/min.) | Percent of the Total Catalyst and Monomer Added per Minute |
|---|---|---|---|---|---|
| Example Number: | | | | | |
| 2 | 6 | 2 | 1.87 | 8.33 | 0.28 |
| 3 | 2¼ | 2⅔ | 4.78 | 21.4 | 0.71 |
| 4 | 2 | 2 | 5.58 | 25 | 0.83 |
| 5 | 2½ | | 4.58 | 20 | 0.66 |
| 6 | 5 | | 2.48 | 10 | 0.33 |
| 7 | 3½ | 1½ | 3.74 | 14.3 | 0.48 |
| 8 | 6 | | 1.87 | 8.33 | 0.28 |
| 9 | 9 | 1½ | 1.26 | 5.5 | 0.18 |
| 10 | 2 | 3 | 6.55 | 25 | 0.83 |
| 11 | 12 | | 1.09 | 4.2 | 0.14 |
| 12 | 2⅔ | 3 | 4.78 | 21.4 | 0.71 |
| 13 | 2 | 4 | 6.55 | 25 | 0.83 |
| 14 | 2 | 5½ | 6.55 | 25 | 0.83 |

TABLE III

| | Examples | | | | | | | | | | | | |
|---|---|---|---|---|---|---|---|---|---|---|---|---|---|
| | 2 | 3 | 4 | 5 | 6 | 7 | 8 | 9 | 10 | 11 | 12 | 13 | 14 |
| Latex wgt. (gms.) [1] | 1,245.6 | 1,250 | 1,250 | 1,237 | 1,212 | 1,293 | 1,202.8 | 1,288 | 1,244 | 1,233.5 | 1,066 | 1,281 | 1,325 |
| Polymer yield, percent | | 96 | 94 | 88 | 88 | 98.8 | 93 | 85 | 89 | 89 | 80 | 94 | 94 |
| pH | 4.3 | 4.3 | 4.3 | 4.7 | 4.4 | 4.4 | 4.0 | 4.1 | 4.6 | 4.4 | 4.6 | 4.2 | 4.4 |
| Color | White | White | White | | | | | | | | | | |
| Brookfield Viscosity, cps | 150–160 | 315 | 580 | 325 | 800 | 605 | 350 | 1,500 | 160= | 774 | 1,600 | 848 | 245 |
| Residual Vinyl Monomer, percent [1] | 1.0 | 1.2 | 0.9 | 3.3 | 1.6 | .95 | .65 | 1.0 | | | 0.8 | | |
| Particle size (Microns) | 3–4 | 2 | 2 | 3 | 1–3 | 1–3 | 2 | 2–3 | 3–6 | 3–5 | –5–2 | 3–5 | 3–5 |
| Percent Solids: | | | | | | | | | | | | | |
| Actual | | 50.9 | 50.3 | 49 | 54.7 | 60.2 | 51.9 | 45.0 | 56.7 | 56.8 | 50.6 | 57.9 | 56.4 |
| Theoretical | | 51.9 | 51.9 | | | | | | | | | | |
| Copolymer composition (percent VA by IR) | 81 | 77 | 75 | 79.8 | 73.1 | 81.0 | 81.0 | 70.6 | 89.8 | 80.9 | 87 | 94.3 | 92.6 |
| Copolymer specific viscosity (1.0 wt./mol, percent in $CHCl_3$) [2] | .79 | .74 | .54 | .57 | .75 | .73 | .59 | .35 | 1.8 | 0.5 | 0.6 | 1.08 | .68 |
| MFT, ° C | | 11.2 | | | | | | | | | | | |
| Latex strength properties: | | | | | | | | | | | | | |
| Tensile strength, p.s.i. | | | | 483 | 236 | 378 | | 138 | 1,411 | 158 | 594 | | 832 |
| Percent Elongation at break | | | | 380 | 617 | 728 | | 893 | 37.3 | 688 | 496 | | 625 |
| $M_u/W+M_t$ | .05 | .055 | .055 | .055 | .06 | .061 | .055 | .055 | .064 | .064 | .055 | .064 | .064 |

[1] Slight losses due to handling. [2] Based on the weight of the total monomer charge.

total amount of unreacted monomer present in the emulsion medium at any time during the course of the polymerization reaction does not exceed approximately 7% by weight based on the combined amounts of water present in said emulsion medium and total monomer to be polymerized and wherein said catalyst and monomer additions are carried out synchronously.

2. A process according to claim 1 wherein said free-radical-supplying polymerization catalyst is water soluble.

3. A process according to claim 2 wherein said free-radical-supplying polymerization catalyst is potassium persulfate.

4. A process according to claim 1 wherein said vinyl alkyl ether is isobutyl vinyl ether.

5. A process according to claim 1 wherein said vinyl alkyl ether is n-butyl vinyl ether.

6. A process according to claim 1 wherein said vinyl alkyl ether is n-octyl vinyl ether.

7. A process according to claim 1 wherein said vinyl alkyl ether is dodecyl vinyl ether.

8. A process according to claim 1 wherein said aqueous emulsion medium comprises water, and at least one each of a surface-active agent, a protective colloid and a buffering agent.

9. An emulsion polymerization process for the preparation of a stable, aqueous emulsion of a copolymer of vinyl acetate and a vinyl alkyl ether which comprises adding concurrently to an aqueous emulsion medium devoid of polymerization catalyst which has been heated to a temperature within the range of from about 65 to about 95° C., separate solutions comprising respectively, (a) a monomer mixture consisting essentially of from about 65 to 99.9% by weight of vinyl acetate and correspondingly, from 0.1 to 35% by weight of a vinyl alkyl ether in amounts ranging up to about 16% by weight of the total monomer mixture to be polymerized, and (b) a free-radical-supplying polymerization catalyst in amounts ranging from about .04 to about 0.8% by weight of the increment of monomer mixture added, allowing the polymerization reaction thus occurring to proceed to substantial completion prior to the addition of succeeding increments of monomer and catalyst and repeating the foregoing cycle until all catalyst and monomer to be polymerized have been added.

10. A process according to claim 9 wherein said free-radical-supplying polymerization catalyst is water soluble.

11. A process according to claim 10 wherein said free-radical-supplying polymerization catalyst is potassium persulfate.

12. A process according to claim 9 wherein said vinyl alkyl ether is isobutyl vinyl ether.

13. A process according to claim 9 wherein said vinyl alkyl ether is n-butyl vinyl ether.

14. A process according to claim 9 wherein said vinyl alkyl ether is n-octyl vinyl ether.

15. A process according to claim 9 wherein said vinyl alkyl ether is dodecyl vinyl ether.

16. A process according to claim 9 wherein said aqueous emulsion medium comprises water, and at least one each of a surface-active agent, a protective colloid and a buffering agent.

17. An emulsion polymerization for the preparation of a stable, aqueous emulsion of a copolymer of vinyl acetate and a vinyl alkyl either which comprises incrementally adding to an aqueous emulsion medium devoid of polymerization catalyst, separate solutions comprising respectively (a) a monomer mixture consisting essentially of from 65 to 99.9% by weight of vinyl acetate and correspondingly from 0.1 to 35% by weight of vinyl alkyl ether and (b) a free-radical-supplying polymerization catalyst wherein said monomer and catalyst solutions are added at a rate approximating the polymerization reaction rate extant in the said emulsion medium, said additions being further so controlled that the total amount of unreacted monomers present in the emulsion medium at any time during the course of the polymerization corresponds to the following equation:

$$\frac{M_u}{W+M_t} \leq 0.07$$

wherein $M_u$ represents the total amount of unreacted monomer present in the aqueous emulsion medium at a given time during the polymerization reaction, $M_t$ represents the total amount of monomer to be polymerized and W represents the total amount of water present in the emulsion medium and wherein the total amount of catalyst introduced synchronously with a given increment of monomer corresponds to the following equation:

$$\frac{C}{N}=C_p$$

wherein C represents the total quantity of catalyst to be employed during the complete polymerization, N represents the total number of catalyst and monomer increments to be added and $C_p$ represents the amount of catalyst contained in a given increment.

References Cited

UNITED STATES PATENTS

| | | | |
|---|---|---|---|
| 2,611,754 | 8/1962 | Rudoff | 260—29.6 |
| 3,023,198 | 2/1962 | Nowlin et al. | 260—29.6 |
| 3,164,562 | 1/1965 | Breed | 260—29.6 |
| 3,168,594 | 2/1965 | Hoshi et al. | 260—899 |

FOREIGN PATENTS 249,041  1/1964  Australia.

MURRAY TILLMAN, Primary Examiner

H. ROBERTS, Assistant Examiner

U.S. Cl. X.R.

117—132, 139.5, 142, 148, 155, 161; 260—85.7